(12) United States Patent
Diamond et al.

(10) Patent No.: US 8,524,300 B1
(45) Date of Patent: Sep. 3, 2013

(54) COVERED RETRACTED CONFECTIONERY

(75) Inventors: Sidney Diamond, Barrington Hills, IL (US); David Lisowski, Schaumburg, IL (US)

(73) Assignee: Imaginings 3, Inc., Niles, IL (US)

( * ) Notice: Subject to any disclaimer, the term of this patent is extended or adjusted under 35 U.S.C. 154(b) by 0 days.

(21) Appl. No.: 13/463,762

(22) Filed: May 3, 2012

(51) Int. Cl.
*A23G 3/50* (2006.01)
*B65D 81/34* (2006.01)
*B65D 81/32* (2006.01)
*B65D 43/26* (2006.01)
*B65D 85/72* (2006.01)
*A23L 1/00* (2006.01)
*B65H 1/08* (2006.01)
*B43K 21/02* (2006.01)
*B43K 7/12* (2006.01)

(52) U.S. Cl.
USPC ........... 426/115; 426/104; 426/110; 426/134; 220/262; 206/385; 221/232; 401/59; 401/62; 401/101

(58) Field of Classification Search
USPC ....... 426/115, 134, 110, 104, 90, 91; 401/81, 401/59, 62, 102, 99, 107, 101, 108, 195, 401/78, 82, 84; 221/248, 239, 255, 256, 221/257; 206/804, 385, 738, 45.2; 220/8, 220/264, 263, 262, 326, 318; 224/281; 292/101
See application file for complete search history.

(56) References Cited

U.S. PATENT DOCUMENTS

| 2,443,361 | A | * | 6/1948 | Satz et al. | 401/59 |
| 2,552,697 | A | * | 5/1951 | Tursky | 401/59 |
| 2,610,732 | A | * | 9/1952 | Calhoun | 401/59 |
| 2,626,049 | A | * | 1/1953 | Tursky | 401/101 |
| 3,192,552 | A | * | 7/1965 | King | 401/116 |
| 4,838,722 | A | * | 6/1989 | Katz | 401/101 |
| 5,131,774 | A | * | 7/1992 | Katz | 401/99 |
| 5,531,318 | A | * | 7/1996 | Coleman et al. | 206/738 |
| 5,913,453 | A | | 6/1999 | Coleman et al. | |
| 6,136,352 | A | * | 10/2000 | Silverstein et al. | 426/115 |
| 6,530,709 | B1 | * | 3/2003 | Washington | 401/272 |
| 6,763,681 | B1 | | 7/2004 | Klundt | |
| 7,331,730 | B2 | * | 2/2008 | Fukui et al. | 401/108 |
| 2009/0097899 | A1 | * | 4/2009 | Carroll | 401/109 |

* cited by examiner

*Primary Examiner* — Rena Rye
*Assistant Examiner* — Danny Chen
(74) *Attorney, Agent, or Firm* — John S. Pacocha

(57) ABSTRACT

A covered retracted confectionery including a housing with covers hinged adjacent the top for movement between closed and open positions. The lower part of each of the covers being contacted by a part of a shaft moveable in the housing between a retracted position and an extended position with respect to the housing to keep the covers closed against the force of gravity. A confectionery carried adjacent the top of the shaft is enclosed by the covers until they are manually moved to the open position by operation of an actuator slideably mounted on the exterior of the housing against a bias. Upon release of the actuator, the bias will automatically retract the shaft and confectionery as well as close the covers.

15 Claims, 4 Drawing Sheets

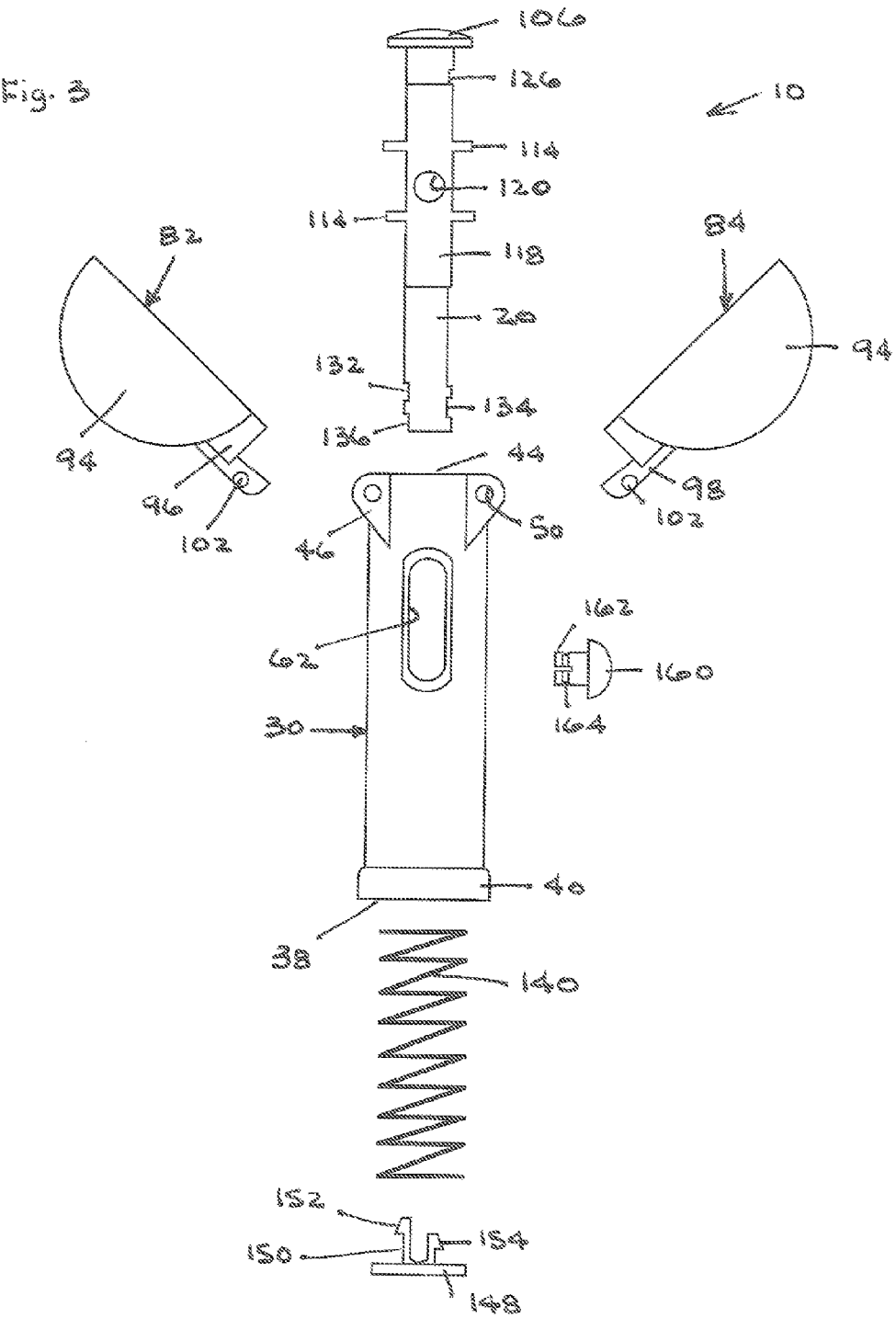

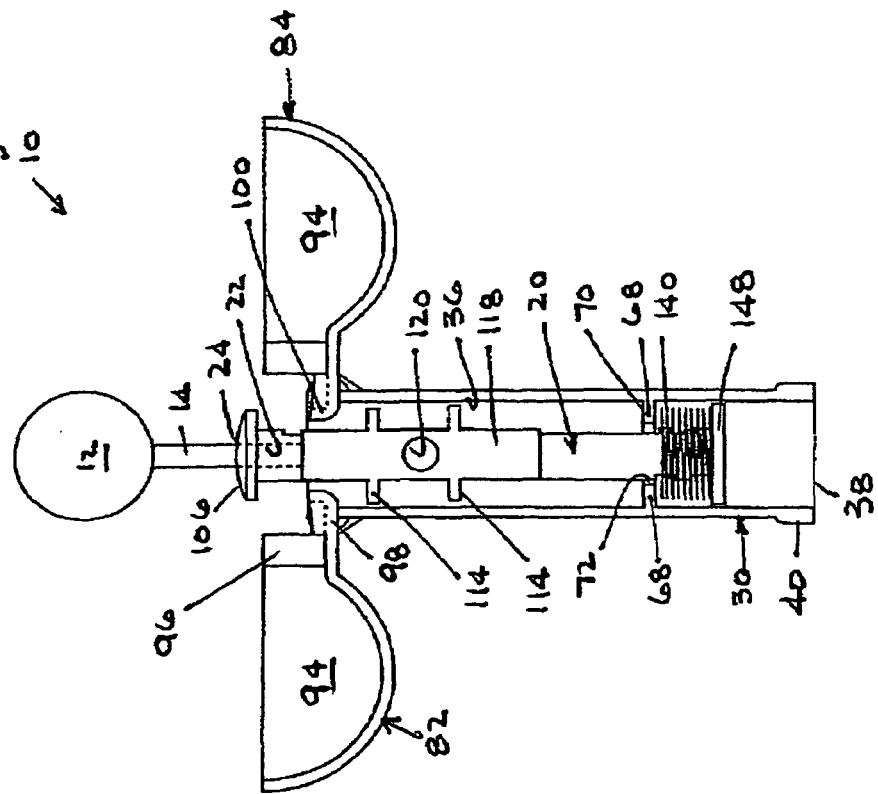

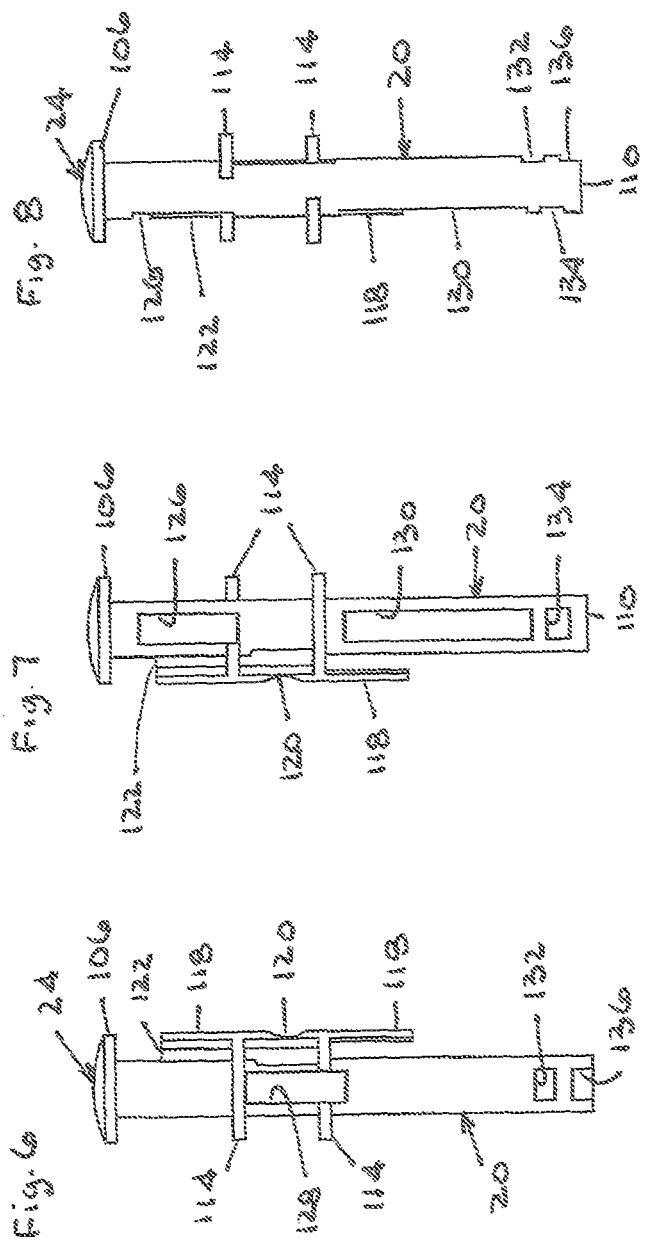

COVERED RETRACTED CONFECTIONERY

BACKGROUND OF THE INVENTION

1. Field of the Invention

This invention relates generally to novelty confectionery devices and more particularly to closed storage devices for confectioneries which have not yet been consumed or are not fully consumed by the user.

2. Background Art

Confectioneries, particularly hard candy such as lollipops, have long been popular, including as part of novelty items. For example, Klundt U.S. Pat. No. 6,763,681 issued Jul. 20, 2004 shows a ring, wearable by the user, with a spring connecting a holder for a lollipop, consumable by the user. In Coleman et al. U.S. Pat. No. 5,913,453 issued Jun. 22, 1999 a replaceable lollipop is received atop a cylindrical dispenser for small pieces of candy or gum with a slotted dispensing shaft that is pressed upwardly against the bias of a spring into the small pieces to dispense them through the shaft.

Efforts have been made in the prior art to enclose confectioneries such as lollipops which have not yet been consumed or are not fully consumed by the user. For example, Silverstein et al. U.S. Pat. No. 6,136,352 issued Oct. 24, 2000 shows an upwardly spring biased hard candy in a cylindrical barrel with a removable cap.

In at least the mid 1990's Chupa Chups sold a product under the register trademark "PEN POP" which was both a pen and a lollipop; sliding a button down exposed a pen for writing and sliding the same button up retracted the pen and exposed the lollipop through a split top cover (generally styled as the head of a licensed character) for consumption. Later in the 1990's, a similar confectionery product, but without the pen feature was sold by a company doing business as Fantazzmo under the registered trademark "SLIDE POP". Coleman et al. U.S. Pat. No. 5,531,318 issued Jul. 2, 1996 shows a housing for replaceable hard candy with a split cap or top that is spring biased to close once the candy is manually retracted.

All of these prior art products have the disadvantage that the consumer, usually a child, had to remember to manually move the actuator down to again cover the confectionery after it was exposed and partially consumed. Accordingly, there remains a need for a closed retracted confectionery that will automatically retract the exposed confectionery and close once the consumer releases the actuator.

SUMMARY OF THE INVENTION

The present invention is concerned with providing a covered retracted confectionery including a housing having an interior and an exterior as well as a top and a bottom, covers hinged adjacent the top of the housing for movement between closed and open positions, each of the covers having a lower tab projecting inwardly toward the center of the housing, a shaft having a top and a bottom, the shaft mounted for movement between a retracted position and an extended position with respect to the housing, a confectionery carried adjacent the top of the shaft, a flange adjacent the top of the shaft below the confectionery, the flange engaging the plates of the hinged covers to close the covers when the shaft is retracted, an actuator slideably mounted on the exterior of the housing to move the shafted from the retracted position to the extended position, and a bias urging the shaft and the confectionery into the retracted position below the closed hinged covers.

The bias may be a spring such as a coil spring which is positioned to be pushed into compression when actuator moves the shafted from the retracted position to the extended position or which is positioned to be pulled into compression when actuator moves the shafted from the retracted position to the extended position.

The covered retracted confectionery may have the shaft with a bottom plug and a lower portion extending upwardly from the bottom plug, the housing with an inwardly projecting wall with an opening through which the lower portion of the shaft fits for movement, the bottom plug of the shaft not fitting through the inwardly projecting wall opening, a coil spring with an internal diameter through which the lower portion fits, but the bottom plug of the shaft does not fit, and the coil spring with an external diameter that does not fit through the inwardly projecting wall opening. The shaft may have openings adjacent the bottom of the shaft; and the bottom plug may be secured to the shaft by a peg having barbs that lock into the openings adjacent the bottom of the shaft.

BRIEF DESCRIPTION OF THE DRAWINGS

For a better understanding of the present invention, reference may be had to the accompanying drawings in which:

FIG. 3 is an exploded left side view of the embodiment shown in FIG. 1, without the character facial features for ease of illustration and without a lollipop;

FIG. 4 is a left side view of the embodiment shown in FIG. 1 showing the internal components without the left side of the housing, and without the character facial features for ease of illustration;

FIG. 5 is a left side view of the embodiment shown in FIG. 1 showing the internal components without the left side of the housing, without the character facial features for ease of illustration, and with the cover open and the candy exposed for consumption;

FIG. 6 is a front view of the inner shaft shown in FIGS. 3, 4 and 5;

FIG. 7 is a rear view of the inner shaft shown in FIGS. 3, 4 and 5; and

FIG. 8 is a right side view of the inner shaft shown in FIGS. 3, 4 and 5.

DETAILED DESCRIPTION

Figure 2:
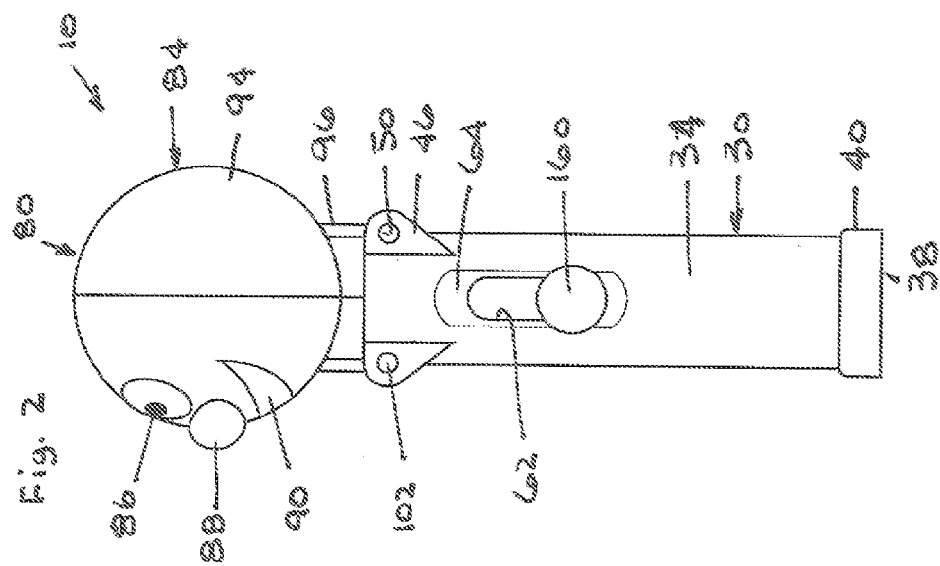
FIG. 2 is a left side view of the embodiment of shown in FIG. 1.

Referring now to the drawings, in which like elements are identified by like reference numerals, there is shown in FIGS. 1, 2, 4 and 5 a covered retracted confectionery 10. As illustrated in the drawings, a hard candy lollipop 12 on a stem 14 is replaceably inserted in a shaft 20, more particularly in bore 22 through the top 24 of shaft 20. The confectionery may be a generally spherical hard candy as illustrated in the drawings, or it may be of any other desired shape. Similarly the stem may be a generally cylindrical piece of wood, compressed paper, plastic or other suitable material conventionally used for lollipops, and it could be tubular or rectangular in cross section or of some other convenient shape. Indeed, the stem may be omitted and the confectionery may be mounted directly on shaft 20. Moreover, the confectionery may be other than a hard candy, as for example a chocolate.

An outer housing 30, which is illustrated in the drawings as a generally hollow cylinder may be of any desired cross-sectional shape, as for example an oval, square or octagon. For purposes of manufacture it may be injection molded of ABS plastic in two generally semi-cylindrical portions 32 and 34 and then connected along a generally vertical parting line (not shown) by an adhesive, ultrasonic welding or the like forming a substantially open interior 36. Adjacent its bottom 38, outer housing may be provided with an enlarged rim 40 to serve as a base and facilitate standing it upright. As illustrated in FIG. 4, rim 40 may be a separate piece attached to housing 30, while as illustrated in FIG. 5 rim 40 may be an integrally formed part of housing 30.

Figure 1:
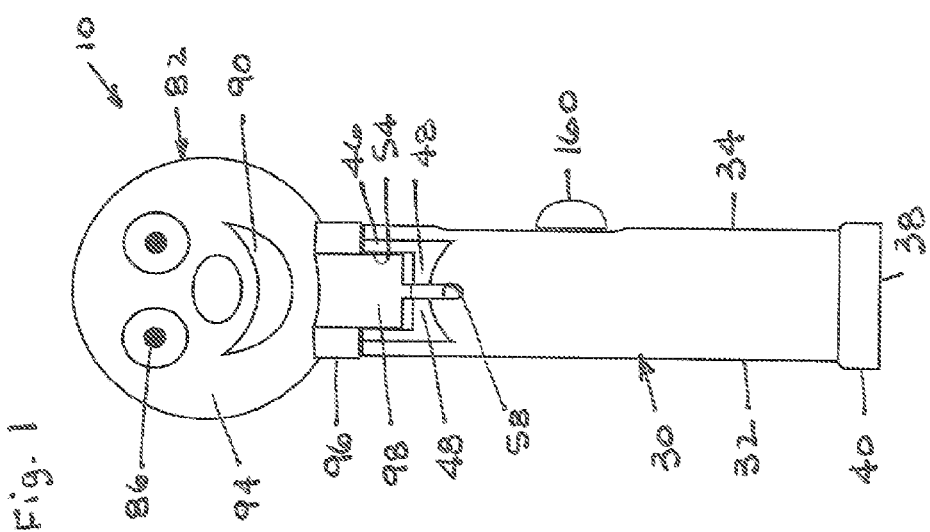
FIG. 1 is a front view of an embodiment of the present invention.

Adjacent its top 44, housing 30 has two pairs of integrally molded tangentially extending spaced apart leafs 46. More particularly, one pair of each of leafs 46 extends tangentially out from the front and back of each semi-cylindrical portion 32 and 34 adjacent top 44. As is best shown in FIG. 1, each leaf 46 has a support branch 48 projecting generally perpendicular to the leaf toward the flat edge of the semi-cylindrical portion. A hole 50 extends through each leaf 46.

When semi-cylindrical portions 32 and 34 are secured together, holes 50 of each of the opposed front leafs are generally axially aligned with each other and holes 50 of each of the opposed back leafs are generally axially aligned with each other. Also, as is perhaps best illustrated in FIG. 1, when portions 32 and 34 are secured together a notch 54 extending down from top 44 to branches 48 is formed between each opposed leaf 46 as a result of the corners being eliminated from between each leaf 46 and the flat edge of the semi-cylindrical portion, and from each branch 48 to top 44. In addition, a short, narrow slot 58 depends below each set of opposed branches as a result of material eliminated adjacent each flat edge of the semi-cylindrical portions below each branch 48.

Intermediate bottom 38 and top 44, closer to top 44 as illustrated in the drawings, one side, more particularly left portion 34 is formed with an oblong closed slot 62 surrounded by a recess 64. Inside of housing 30, more proximate bottom 38 than top 44, formed of substantially perpendicularly inwardly projecting shelves 68, is interior wall 70 with a generally centrally disposed opening 72.

Mounted on top of housing 30 is a cover 80 formed of mating front half 82 and back half 84 molded of a plastic such as ABS. As shown in the drawings, cover 80 is basically spherical and hollow. The cover may be any other desired shape such as a hollow cube or pyramid. Moreover, the cover may be formed of more than the two halves; it may be formed of three, four, or even more mating pieces. Cover, topper or head 80 may also be conveniently made in the form of a recognizable object such as ball used in a particular sport or as the head of some character. Indeed, housing 30 may be made in a complementary form, such as a baseball bat for a baseball topper, or the body of a character to match the head. For ease of illustration, cover 80, more particularly front half 82 is shown in FIGS. 1 and 2 with two dimensional eyes 86, a three dimensional nose 88, and a two dimensional mouth 90.

Each cover half has a substantially hemi-spherical portion 94 with a depending neck 96 and a further depending, generally centrally disposed tang 98. Projecting inwardly toward housing 30 from adjacent the bottom of tang 98 is a tab 100, and projecting out sideways from adjacent the bottom of tang 98 are a pair of opposed pins 102. The interiors of hemispherical portions 94 are conveniently sized so lollipop 12, or whatever other confectionery they are designed for, does not come into contact with the plastic when cover 80 is closed.

Cover 80 is pivotally or hingedly mounted atop housing 30 for movement between the closed position illustrated in FIGS. 1, 2 and 5 and the open position illustrated in FIGS. 3 and 5. More particularly, each pair of opposed pins 102 is received in a corresponding one of holes 50 in a leaf 46 to form a hinge and pivotally mount mating front and back halves 82 and 84 of cover 80 between right and left portions 32 and 34 of housing 30. Slot 58 facilitates assembly of the housing 30 and cover halves 82 and 84 as it provides give or flex when inserting hinge pins 102 in holes 50. As long as housing 30 is in a generally upright or vertical position, each of cover halves 82 and 84 will drop down into the open position of FIGS. 3 and 5 unless they are restrained.

On top 24 of shaft 20 is a dome shaped circular disc 106 having a larger diameter than shaft 20. As is best shown in FIG. 4, the underside of disc 106 abuts tab 100 of each cover half 82 and 84 to restrain them in the closed position of FIGS. 1, 2 and 4.

Shaft 20, which may be molded of a plastic such as polypropylene, has a generally hollow interior below disc 106 down to bottom 110 of shaft 20. Extending substantially radially outward are integrally molded guide ribs of a diameter larger than shaft 20 and less than interior 36 of housing 30. An elongated plate 118 with a substantially centrally disposed opening 120 is also integrally molded as part of shaft 20. Plate 118, which as best shown in FIGS. 6 and 7 is spaced from shaft 20, is connected to shaft 20 by radial arm 122 and portions of guide ribs 114. Shaft 20 also has a number of openings 126, 128, 130, 132, 134 and 136 needed to core out molded shaft 20 based on the direction the manufacturing tool needs to come from to accomplish creating a hole for the lollipop stem and create slots for locking in a bottom plug.

Bottom 110, as well as the lower portion of shaft 20 up to plate 118, readily fits and is supported for reciprocating movement substantially along the axis of housing 30 in opening 72 of wall 70. As is shown in the drawings, the portion of shaft 20 having openings 132, 134 and 136, is disposed below wall 70 in both the open and closed positions of covered retracted confectionery 10. Surrounding the lower portion of shaft 20 below wall 70 is a coil spring 140.

The spring has an inner diameter larger than the outer diameter of shaft 20 so the shaft may freely move inside the spring and its outer diameter is smaller than interior 36 of housing 30. As shown in the drawings coil spring 140 is of a convention design having a constant inner diameter and a constant outer diameter. However, as long as the upper coil is larger than opening 72, spring 140 will abut the underside of wall 70 and be kept below wall 70. Spring 140 may be otherwise be of any appropriate size and suitable material to overcome the force of gravity keeping cover halves 82 and 84 open in its expanded position shown in FIG. 4 as long as it is not so strong as to preclude a user such as a small child from readily compressing it to the position shown in FIG. 5

A bottom plug 148 having an integrally molded upwardly projecting bifurcated barbed peg 150 fits into bottom 38 of housing 30 and abuts the lower coils of spring 140. Plug 148, more particularly peg 150, is secured on bottom 110 of shaft 20. Bifurcated peg 150 is compressed upon its insertion into bottom 110 until barbs 152 and 154 expand into openings 132 and 134, respectively, to lock bottom plug 148 onto bottom 110 of shaft 20. Staggering the respective height of barbs 152 and 154 rather than having them aligned facilitates assembly in cooperation with the openings in shaft 20 and causes a one-time snap locking plug 148 in shaft 20 to occur only if assembled correctly to ensure there is no small part safety issue.

An actuator button 160 having a bifurcated stem 162 with a circumferential slot 164 is inserted though oblong slot 62 of housing 30 and secured in aperture 120 with plate 118 frictionally engaging slot 164. Stem 162 is received for sliding reciprocating movement in oblong slot 62 with actuator button 160 moveable generally vertically along the outside of housing 30 as shown in the drawings.

In operation the user manually pushes actuator button 160 upwardly, moving shaft 20 including disc 106, lollipop 12, and bottom plug 148 upwardly inside housing 30. As disc 106 moves upwardly away from its abutment with tabs 100 of hinged cover halves 82 and 84 allowing them to drop open from the force of gravity, lollipop 12 is exposed for consumption. At the same time, the upward movement of bottom plug 148 compresses spring 140. Accordingly, when actuator 160 is released, the bias of compressed spring 140 will automatically retract shaft 20 with lollipop 12, and at the same time move disc 106 back down into contact with tabs 100 and cause cover halves 82 and 84 to pivot back up to the closed position.

Such automatic retraction and closure helps keep the confectionery from getting dirty or contaminated by dust, bugs, or the like. It also helps keep the confectionery from ending up sticking to a seat, or table, or the like. Moreover, at retail in a point of purchase display, the confectionery will not be exposed until the user slides a "try me" button up on a package, and then the product will not be left open because it will close automatically once the prospective purchaser leaves or removes the package for purchase. There is also the advantage of a somewhat unexpected magical effect of the automatic closure of the topper halves.

As an alternative, a spring may be provided between say the upper guide rib 114 and an inner wall similar to wall 70 but positioned below tangs 98 such that the spring is pushed into compression when actuator bottom 160 is moved up to open the cover and expose the confectionery. In a still further variation, the bias could be proved by an elastic band or the like rather than a spring. Such an elastic band would be stretched when actuator bottom 160 is moved up to open the cover and expose the confectionery, and would then automatically pull shaft 20 down when button 160 is released. In a still further modification, the bias could operate directly on the actuator button.

While particular embodiments of the invention have been shown and described with some variations and alternatives, further variations and modifications will occur to those skilled in the art. It is intended in the appended claims to cover all such variations and modifications that come within the true spirit and scope of the present invention.

What is claimed as new and desired to be secured by Letters Patent is:

1. A covered retracted confectionery comprising:
   a housing having an interior and an exterior as well as a top and a bottom;
   covers hinged adjacent the top of the housing for movement between closed and open positions;
   each of the covers having a lower tab projecting inwardly toward the center of the housing;
   a shaft having a top and a bottom;
   the shaft mounted for movement between a retracted position and an extended position with respect to the housing;
   a confectionery carried adjacent the top of the shaft;
   a flange adjacent the top of the shaft below the confectionery;
   the flange engaging the plates of the hinged covers to close the covers when the shaft is retracted;
   an actuator slideably mounted on the exterior of the housing to move the shafted from the retracted position to the extended position; and
   a bias urging the shaft and the confectionery into the retracted position below the closed hinged covers; and
   the bias is positioned to be increased when the actuator moves the shaft from the retracted position to the extended position.

2. The covered retracted confectionery of claim 1 in which the bias is a spring.

3. The covered retracted confectionery of claim 2 in which the spring is a coil spring.

4. The covered retracted confectionery of claim 3 in which:
   the shaft has a bottom plug and a lower portion extending upwardly from the bottom plug;
   the housing has an inwardly projecting wall with an opening through which the lower portion of the shaft fits for movement;
   the bottom plug of the shaft does not fit through the inwardly projecting wall;
   the coil spring has an internal diameter through which the lower portion, but not the bottom plug, of the shaft fits; and
   the coil spring has an external diameter that does not fit through the inwardly projecting wall opening.

5. The covered retracted confectionery of claim 4 in which:
   the shaft has openings adjacent the bottom of the shaft; and
   the bottom plug is secured to the shaft by a peg having barbs that lock into the openings adjacent the bottom of the shaft.

6. The covered retracted confectionery of claim 1 in which the bias is positioned to be pushed to increase the bias when the actuator moves the shaft from the retracted position to the extended position.

7. The covered retracted confectionery of claim 1 in which the bias is positioned to be pulled to increase the bias when the actuator moves the shaft from the retracted position to the extended position.

8. A covered retracted confectionery comprising:
   a housing having an interior and an exterior as well as a top and a bottom;
   covers hinged adjacent the top of the housing for movement between closed and open positions;
   each of the covers having a lower tab projecting inwardly toward the center of the housing;
   a shaft having a top and a bottom;
   the shaft mounted for movement between a retracted position and an extended position with respect to the housing;
   a confectionery carried adjacent the top of the shaft;
   a flange adjacent the top of the shaft below the confectionery;
   the flange engaging the plates of the hinged covers to close the covers when the shaft is retracted;
   an actuator slideably mounted on the exterior of the housing to move the shaft from the retracted position to the extended position;
   a spring urging the shaft and the confectionery into the retracted position below the closed hinged covers; and
   the spring is positioned to be pushed into compression when the actuator moves the shafted from the retracted position to the extended position.

9. The covered retracted confectionery of claim 8 in which the spring is a coil spring.

10. The covered retracted confectionery of claim 9 in which:
   the shaft has a bottom plug and a lower portion extending upwardly from the bottom plug;
   the housing has an inwardly projecting wall with an opening through which the lower portion of the shaft fits for movement;

the bottom plug of the shaft does not fit through the inwardly projecting wall;

the coil spring has an internal diameter through which the lower portion, but not the bottom plug, of the shaft fits; and the coil spring has an external diameter that does not fit through the inwardly projecting wall opening.

11. The covered retracted confectionery of claim 10 in which:

the shaft has openings adjacent the bottom of the shaft; and the bottom plug is secured to the shaft by a peg having barbs that lock into the openings adjacent the bottom of the shaft.

12. A covered retracted confectionery comprising:

a housing having an interior and an exterior as well as a top and a bottom;

covers hinged adjacent the top of the housing for movement between closed and open positions;

each of the covers having a lower tab projecting inwardly toward the center of the housing;

a shaft having a top and a bottom;

the shaft mounted for movement between a retracted position and an extended position with respect to the housing;

a confectionery carried adjacent the top of the shaft;

a flange adjacent the top of the shaft below the confectionery;

the flange engaging the plates of the hinged covers to dose the covers when the shaft is retracted;

an actuator slideably mounted on the exterior of the housing to move the shaft from the retracted position to the extended position;

a spring urging the shaft and the confectionery into the retracted position below the closed hinged covers; and the spring is positioned to be pulled into compression when the actuator moves the shafted from the retracted position to the extended position.

13. The covered retracted confectionery of claim 12 in which the spring is a coil spring.

14. The covered retracted confectionery of claim 13 in which:

the shaft has a bottom plug and a lower portion extending upwardly from the bottom plug;

the housing has an inwardly projecting wall with an opening through which the lower portion of the shaft fits for movement;

the bottom plug of the shaft does not fit through the inwardly projecting wall;

the coil spring has an internal diameter through which the lower portion, but not the bottom plug, of the shaft fits; and the coil spring has an external diameter that does not fit through the inwardly projecting wall opening.

15. The covered retracted confectionery of claim 14 in which:

the shaft has openings adjacent the bottom of the shaft; and the bottom plug is secured to the shaft by a peg having barbs that lock into the openings adjacent the bottom of the shaft.

* * * * *